UNITED STATES PATENT OFFICE.

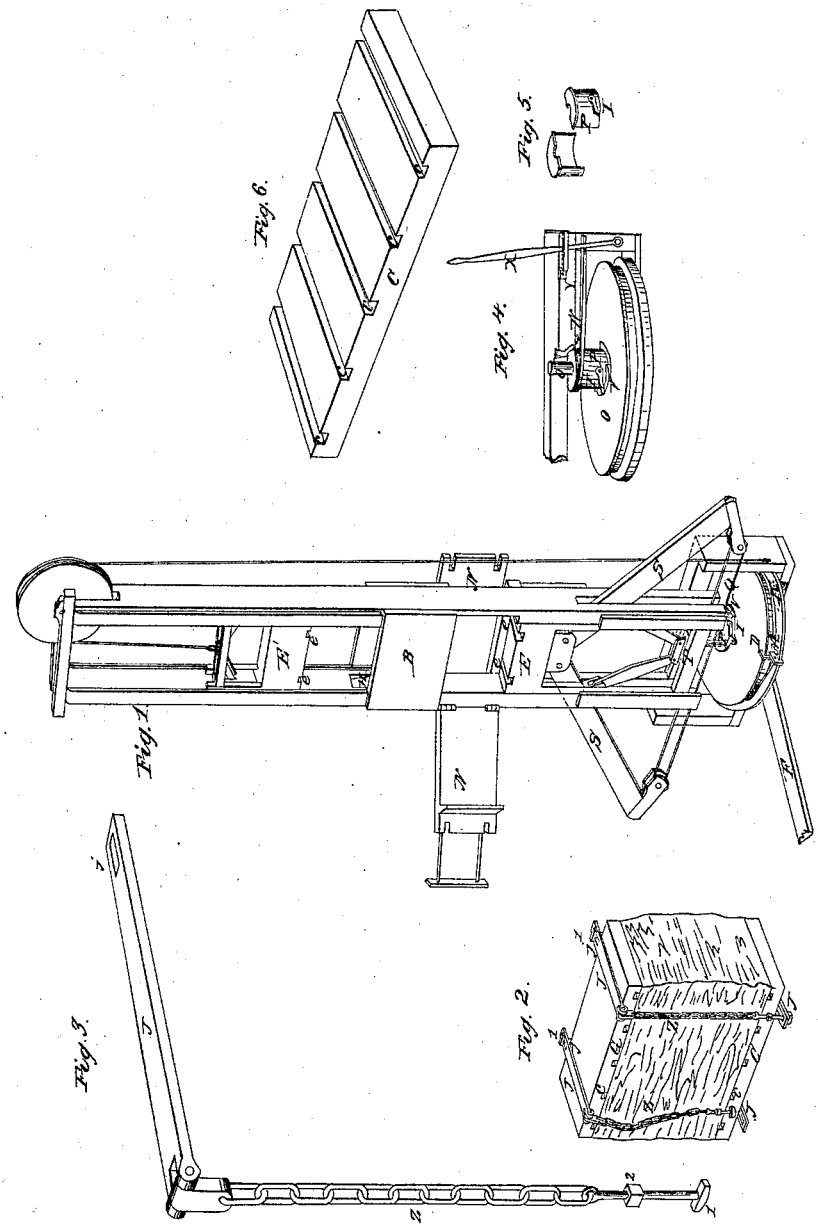

IRA JAMES, OF MATTOON, ILLINOIS.

IMPROVEMENT IN HAY AND COTTON PRESSES.

Specification forming part of Letters Patent No. 41,625, dated February 16, 1864.

*To all whom it may concern:*

Be it known that I, IRA JAMES, of Mattoon, Coles county, Illinois, have invented new and useful Improvements in Hay-Presses; and I do hereby declare the following to be a full, clear, and exact description thereof, reference being had to the accompanying drawings, making part of this specification.

My invention relates to, first, devices for increasing the efficiency of that class of vertical hay-presses in which the hay is reduced in bulk before pressing by means of a beater; second, to provisions for enabling the bale to be hooped outside of the press.

Figure 1 is a perspective view of a vertical hay-press. Fig. 2 represents a bale clamped and removed ready for hooping. Fig. 3 shows a clamp-bar and its appendages. Fig. 4 is a detached view of my capstan. Fig. 5 shows my sleeve in sectional perspective. Fig. 6 shows the lower batten on an enlarged scale.

The frame A, box B, capstan O, trip-iron K, dog D, slide-head M, sweep F, and doors N and N' may be substantially such as now used in the "Hewitt" and other vertical presses. The follower E and beater E' are grooved, e, to receive my clamps hereinafter described. The shaft o of the capstan O in my press carries a sleeve, P, to which is attached a cord or chain, Q, which is rove through pulleys in the toggles S, whose lower extremities are fulcrumed to rail T of the frame, their upper ends being hinged to the follower E. A pawl, I, pivoted to the sleeve P, engages, when desired, in ratchet V on capstan and compels the sleeve to rotate with the capstan.

To enable the operator to hold the sleeve stationary when desired, I have applied a brake-movement consisting of a pressure-band, W, lever X, and yoke Y.

Having thus described my combination for pressing the hay, I now proceed to explain my mode of enabling the removal of the pressed hay for the purpose of hooping outside of the press.

C is the lower and G is the upper of two battens having grooves c corresponding in number with the bale-hoops.

J are four bars, each slotted, j, at one end, and having appended to the other end a chain, L, which terminates in a T-head, 1, having a square shank, 2.

Operation: The follower E being down, the batten C is placed upon it and the doors N N' are closed. The hay being then fed in at the top of the box B, about five blows of the beater E' ordinarily suffice to compress the hay sufficiently for my pressing action. This consumes from three to four minutes. The top board or batten, G, is then placed in the box and descends with the beater at its final stroke. The operation down to this point is substantially the same as that commonly employed in vertical beater-presses. The dog D is now removed, and the pawl I is engaged in the ratchet V of the capstan O. The team being then started in the same direction as for beating, the capstan O begins to draw on the chains or cords Q, acting to draw the toggles S together, and to elevate the follower E with a progressive power for the space of about five feet, and so as to compress the hay into a thickness of about twenty four inches. The doors N N' being then thrown open, I remove the compressed hay from the press by the following means: The four bars J being slipped into the grooves e in the follower and beater, the T-heads 1 are engaged in the slots j. The sleeve P being then held fast by means of the brake X, the dog D is withdrawn and the pawl I disengaged from the ratchet V. The brake X, being now relaxed, allows the follower E to descend and relieves the bale, which may now be removed for hooping outside of the press. The bale having been hooped, the clamps are disengaged by a quarter-turn of the T-heads by means of a wrench. The descent of the follower E and of the toggles S is accomplished without any rotation of the capstan O, which remains perfectly stationary until the beating is resumed. The dog D being now replaced, the above-described operation is repeated, the hooping of the bale not delaying the pressing action.

I claim herein as new and of my invention—

1. The provision, in a vertically-acting beater hay-press, of sleeve P, ratchet and brake movements I V and W X, and pulley and toggle movements Q S T, the whole being combined and operating substantially as set forth.

2. The combination of the slotted bars J J J J, chains Z Z, catches 1 2, and grooved battens C c G c, all constructed, arranged, and operating as herein shown and described, to enable the removal of the bale for hooping or binding outside of the press, in the manner set forth.

In testimony of which invention I hereunto set my hand.

IRA JAMES.

Witnesses:
C. B. BOSTWICK,
E. JEFFORDS.